Oct. 11, 1966   F. W. R. STARP   3,277,805
PHOTOGRAPHIC CAMERA
Filed Jan. 9, 1964                                           2 Sheets-Sheet 1

INVENTOR.
Franz W. R. Starp
BY
Arthur A. March
ATTORNEY

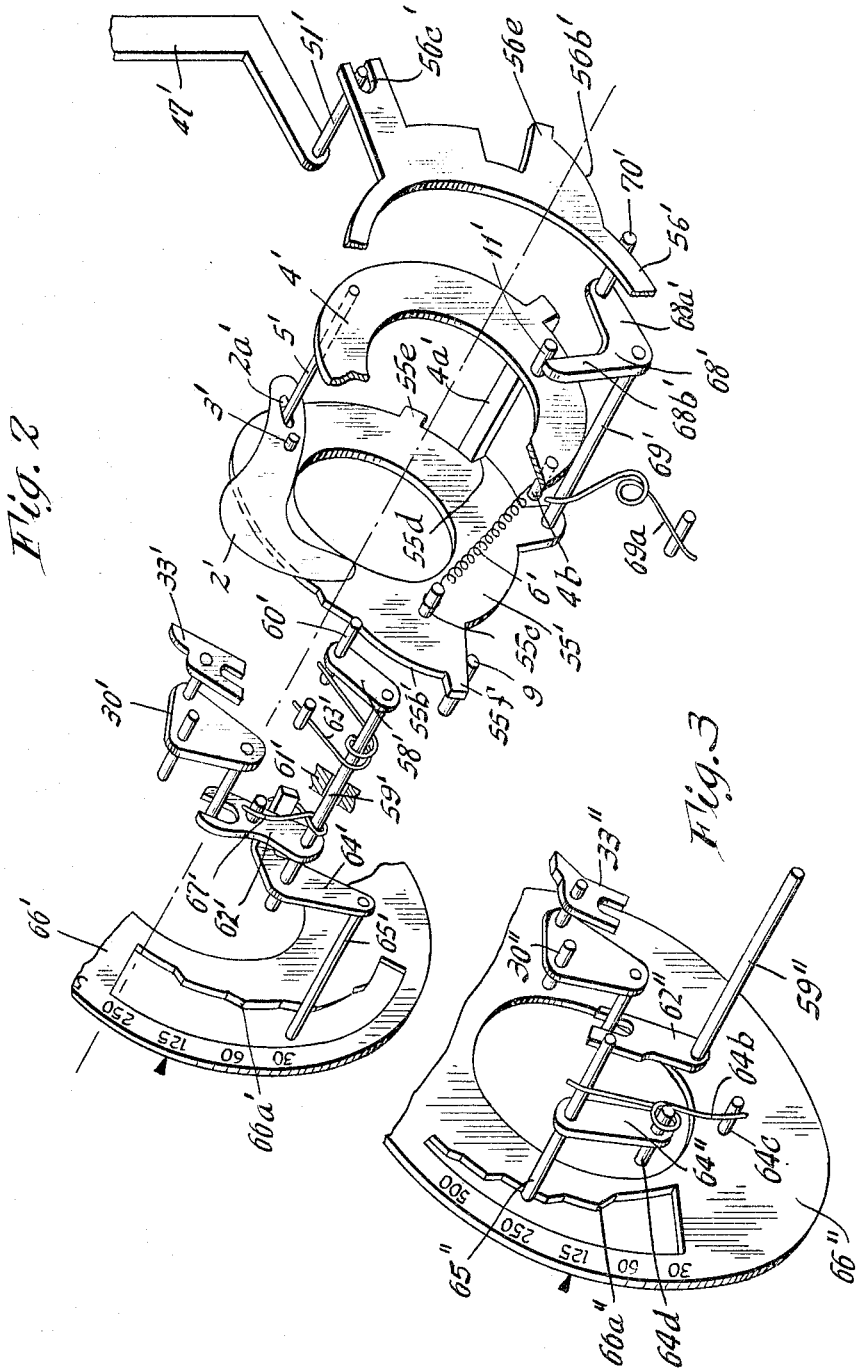

United States Patent Office 3,277,805
Patented Oct. 11, 1966

3,277,805
PHOTOGRAPHIC CAMERA
Franz W. R. Starp, Calmbach (Enz), Germany, assignor to Alfred Gauthier, G.m.b.H., Calmbach (Enz), Germany, a corporation of Germany
Filed Jan. 9, 1964, Ser. No. 336,722
Claims priority, application Germany, Jan. 12, 1963,
G 36,823
12 Claims. (Cl. 95—10)

This invention relates to photographic cameras having means to control both of the basic exposure parameters, exposure time and diphragm aperture size, one of which can be preselected and the other of which is set automatically by photoelectric means with provision to revise the preset parameter automatically if necessary.

It is known to provide camera mechanisms having planetary gears and springs for automatically controlling one of the exposure parameters, or factors, under the guidance of a photoelectric exposure meter and in response to the previous setting of another exposure factor. The planetary gear in such prior apparatus is connected with two control cams for the purpose of adjusting the setting devices for the exposure factors, these devices in turn being mounted on shafts arranged eccentrically with respect to the axis of the shutter. The cam designed to take into account the preselectable exposure factor is a component of another planetary gear which is located in the shutter housing and which is operatively connected to the setting member of the preselectable exposure factor so as to introduce the latter factor into the camera mechanism. However, this prior device comprises a relatively large number of members which must be precisely made and assembled in order to obtain the necessary setting accuracy. This is especially true of the cams, which are provided with curved surfaces and are designed to influence the setting devices for exposure time, or shutter speed, and diaphragm aperture setting, since these cams must have comparatively small dimensions in order to fit in the relatively narrow annular space provided for them in the shutter housing. Thus even minor deviations from the prescribed shape of the cams may have large adverse effects on the desired setting accuracy.

The problem to be solved by the present invention consists in creating, for cameras capable of such operation, a device which insures proper setting of the exposure factors, according to the prevailing light conditions while preserving the basic concept of the shutter arrangement. At the same time a simplified structure is to be provided which will still be capable of operating dependably and accurately in the case of daylight exposures.

The present invention solves this problem by providing two rings movable under the control of a sensing member and operatively connected to each other. Two cams, each associated with one of the movable rings, are connected by suitable linkages or power transmission mechanisms to a setting device which introduces the shutter speed and diaphragm aperture exposure factors into the camera. One of the exposure factors may be considered the preselectable exposure factor and the linkage associated with the setting device that controls this exposure factor has a unidirectional member which operates as a unidirectional drive member to cooperate with a control element, such as a cam, on the control, or setting member, for the preselected exposure factor. As a result the over-all mechanism is capable of preselection of one exposure factor with automatic setting of the other exposure factor with simultaneous correction of the preselected factor. This mechanism has the advantage that it is possible to form the aforementioned cams in a way which allows flexibility and freedom of choice and can be adapted to the respective requirements of these cams in the best possible manner. This is because the cams are located on two rings which may be mounted on the rear wall of the shutter housing and which, to their great advantage, may be coaxial with the optical axis of the shutter and lens. This makes it possible to provide the most favorable shape and dimensions for each of the cams, which, in turn, makes it possible, in the case of comparatively long over-all setting paths of the setting devices, to minimize or eliminate expensive transmission devices which have commonly been a source of inaccuracy in the setting of previous shutters of this general type.

In regard to the linkages or power transmission mechanisms between each of the rings and the setting devices for exposure time and diaphragm aperture, it has been found to be advantageous to make such linkages in the form of levers to insure simplicity and functional dependability as well as accuracy in the transmission of the positional information of the two cams to the setting devices. Moreover, the invention includes a very simple manner of introducing the preselectable exposure factor into the associated setting device as a result of the fact that the linkage associated with that setting device comprises a driving member which operates unidirectionally, for example a lever which exerts force only when it rotates in one direction.

Further in accordance with the invention, the complete mechanism includes an additional setting member, usually in the form of a ring, which is connected to the sensing member of the exposure meter and has a pinion gear rotatably mounted on it and permanently in mesh with teeth on the aforementioned two rings. In order to make these two rings rotate only in one direction during the setting of the exposure factors, it is advantageous to arrange the ring that cooperates with the setting device of the preselectable exposure factor so that it has external teeth while the other ring controlling the other exposure factor has internal teeth.

To assure that the preselected exposure factor is first transmitted to the setting device associated with it, an escapement device, such as a spring brake, may be arranged with the ring associated with the automatically set exposure factor. The brake is set so that it prevents premature movement of that ring.

An embodiment of the device according to the invention which results in a particularly small release moment and an especially simple structure is obtained by providing a diaphragm-lamellae carrying ring as part of the setting device which also includes a cam that acts on the linkage that cooperates with the shutter speed control member and setting device. The ring is connected by suitable linkage, such as a bellcrank lever, to two setting means: one a ring movable by the sensing member and the other a ring adapted to set the diaphragm lamellae and arranged coaxially with the first ring, the two rings for the positioning and the setting of the diaphragm lamellae being designed to support each other tensionally under the influence of a spring.

In order to insure that the preselectable exposure factor is set first, the cam of the ring drivingly connected to the sensing member is developed so that when the shutter release is operated, the rings designed for positioning and setting the diaphragm lamellae are first moved synchronously against the action of a spring acting on the linkage connected thereto. A relative rotary motion is imparted to these rings by a bellcrank lever after the moment of rotation of the ring carrying the diaphragm lamellae is increased by way of a spring in the linkage.

In addition, the linkage acting on the setting device for shutter speed may comprise a forked lever acting on the input member of that setting device as well as a sensing member which is coupled to the forked lever by suitable means such as a spring and which serves as a follower for a cam on the shutter speed control.

The linkage may include a freely movable sensing lever associated with the forked lever and held in engagement with the cam of the shutter speed control by means of a spring acting exclusively on this sensing lever.

Details of the invention will become apparent from the following specification taken together with the accompanying drawings in which:

FIG. 2 shows part of the elements of a shutter similar to that of FIG. 1 but with a modified form of the invention; and FIG. 3 shows a variant of the linkage that cooperates with the setting member which controls the preselectable exposure factor as well as with the setting device connected thereto.

Figure 1:
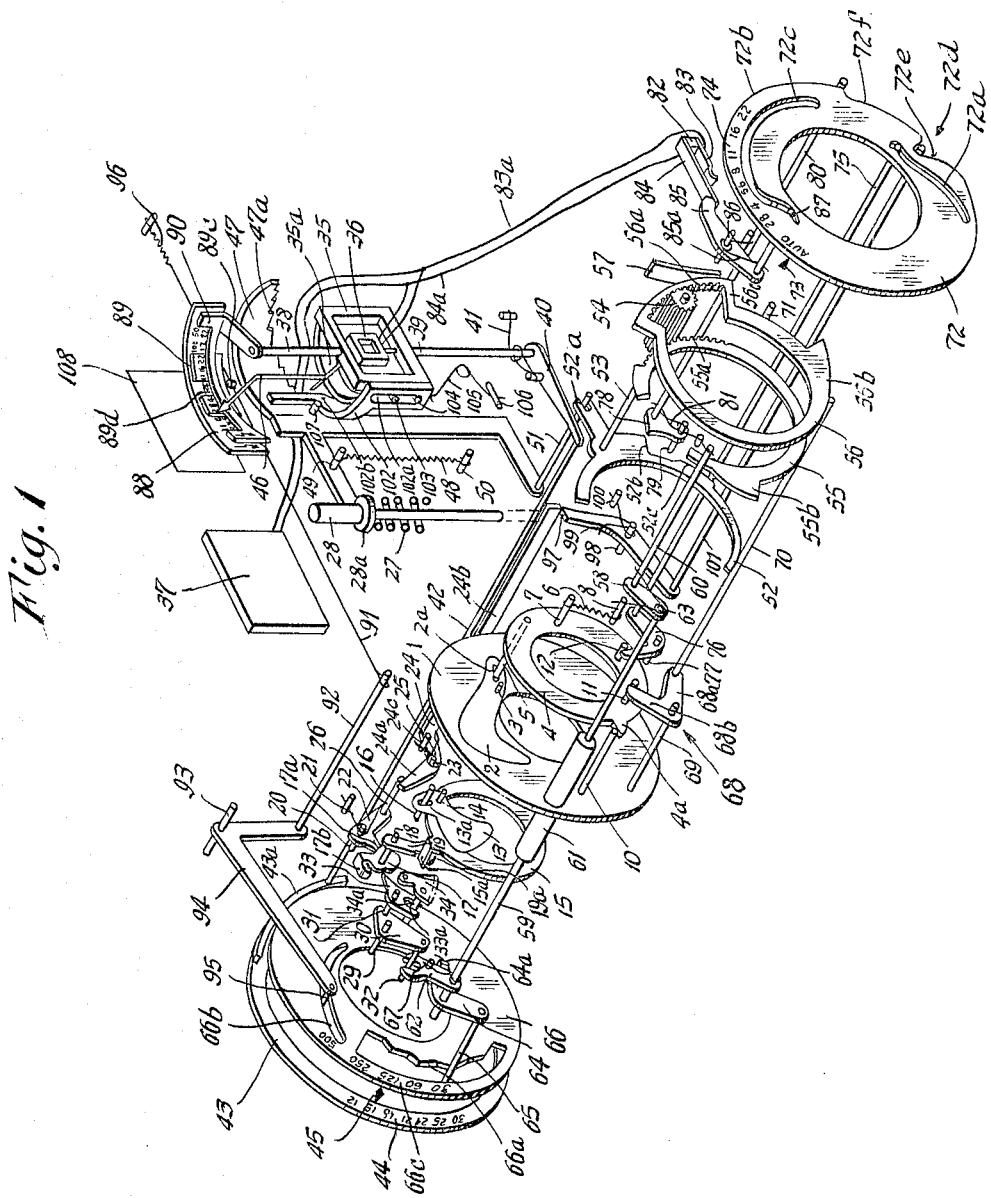
FIG. 1 is a perspective view of apparatus constructed according to the invention in conjunction with other elements of a camera shutter, all of the elements being drawn spread apart axially for greater clarity.

In FIG. 1 a carrier plate 1 is mounted in a shutter housing (not shown) to support a plurality of diaphragm lamellae of which only one lamella 2 is shown. The lamellae are mounted on fixed pins 3 and are actuated by a ring 4 which is able to rotate, at least to a limited extent, and which has a plurality of pins 5 that engage slots 2a in the lamellae. The ring 4 is pulled clockwise by a tension spring 6, one end of which engages a pin 7 on the ring and the other end of which is attached to a fixed pin 8. A projection 4a extends from the ring 4 and engages pin 10 on the plate 1 to serve as a stop for fixing the starting position of the ring 4 with respect to the plate 1. This starting position is, in the embodiment shown, associated with the largest aperture position of the lamellae 2 which position may correspond to a diaphragm value of 2.8 for example. The ring 4 also has two pins 11 and 12 which are engaged by load transmission members, or linkages, of the diaphragm setting mechanisms that operate independently of each other as will be described hereinafter. The lamellae 2 and the other elements connected thereto, as described above, comprise the means to set one of the exposure factors, in this case the diaphragm aperture size.

As in the case of the diaphragm lamellae 2, only one of the shutter blades 13 is shown for reasons of clarity and is mounted on a pin 14 extending from a ring 15. The latter is rotatably mouned in the shutter housing so as to be coaxial with the ring 4 and a pin 16 is rigidly attached to the carrier plate 1 to engage a slot 13a in each of the shutter blades 13. The ring 15 is rotated back and fourth, in a manner which is well known, by driving means comprising a rotatably mounted cocking and driving disc 17 provided with a pin 18 on which a driving pawl 19 is pivotally mounted. The pawl 19 has jaws 19a which engage an arm 15a bent at right angles to the ring 15.

An arresting lever 22 pivotally mounted on a fixed pin 20 is pressed by a coil spring 21 against a projection 17a on the disc 17 to keep the latter in cocked position as shown in the drawing. A release lever 24 pivotally mounted on a journal 23 is pressed against a fixed pin 24c by a spring 25. One arm 24a of the release lever engages a pin 26 on the arresting lever 22 while the other arm 24b extends into a path of motion of a shutter release, or trigger, 28 is pressed upwardly by a compression spring 27 and which may be located in the camera case (not shown).

After the driving disc 17 has been released by the arresting lever 22, the disc rotates by virtue of the pressure of the usual driving spring (not shown) in a counterclockwise direction which causes the pawl 19 to rotate the ring 15 so as to pivot the shutter blades first in one direction to open the shutter and then in the reverse direction to close it again.

An escapement mechanism is provided to obtain different exposure times and is arranged in the shutter housing in a manner which has been known heretofore. This escapement mechanism comprises a plate, or lever, 30 which is pivotally mounted on a fixed pin 29 and is provided with oppositely directed pins 31 and 32. An escapement braking lever 33 is pivotally mounted on the pin 31 to cooperate with the disc 17 and with a toothed segment gear 34 connected to the lever 33 by means of a pin 34a that engages a slot 33a in the lever. If desired, the gear segment 34 may be meshed with other gear members in a manner known heretofore so as to make possible a wide range of shutter speeds. The plate 30, the braking lever 33, the toothed gear segment 34 and the gear members cooperating with the latter may be located on a fixed bearing plate in accordance with similar structures known heretofore.

In order to obtain different exposure times, or different shutter speeds, the braking lever is set at different positions with respect to the lug 17b of the disc 17. This causes the lug 17b to engage the braking lever 33 over a distance determined by the position to which the braking lever is set. The setting of the braking lever is effected by the lever 30, the pin 32 of which engages a linkage connecting it to a photoelectric exposure meter.

The exposure meter includes a frame 35 and a rotating coil 36 pivotally mounted therein. It also includes a photocell 37 electrically connected to the coil 35 to supply an electric current thereto corresponding in intensity to the intensity of light striking the photocell from the scene to be photographed. The frame has two end shafts 38 and 39 which are coaxial with the axis of the rotating coil 36 and which are pivotally mounted in fixed bearings. A lever 40 is rigidly attached to the shaft 39 and the free end of the lever 40 is pressed, by means of a spring 41, against a transmission pin 42 which is movable in a direction parallel to the optical axis of the shutter. The pin 42 bears against the face of a cam 43a on a film sensitivity setting member 43 which may be rotated about the optical axis of the shutter to take the film sensitivity into consideration.

The sensitivity is indicated on a scale 44 which may be set with respect to a fixed mark 45.

Returning to the exposure meter, a needle 46 is affixed to the coil 36 to indicate the light intensity but, because the coil 36 may be preset by the lever 40 and the pin 42, the position of the needle 46 is modified by the setting of the film sensitivity control 43. Part of the mechanism connecting the exposure meter to other portions of the shutter is a sensing member 47 which is made in the form of a slide capable of being moved parallel to the direction of travel of the shutter release trigger 28. The sensing member has an arm that is held against a flange 28a on the trigger by means of a spring 48 so that the slide moves downwardly when the trigger is depressed to make a photographic exposure. The spring is stretched between the pin 49 on the sensing member 47 and a fixed pin 50. This spring is somewhat weaker than the spring 27 so that the latter controls the position of the shutter release except when the photographer overcomes it in order to make an exposure. The sensing member 47 has a stepped cam 47a, one of the steps of which come to rest on the lower extension of the needle 46 when the shutter release 28 is depressed so as to leave the sensing member free to move downwardly under the force of the spring 48. To keep the needle 46 from absorbing all of the force of the spring 48, a supporting member in the form of an arch 35a is provided on the frame 35.

The sensing member 47 is operatively connected by means of a pin 51 with a rotatable setting ring 52 coaxial with the optical axis. The connection between the pin 51 and the ring 52 is a slot 52a on an arm extending from the ring. The setting ring has a pin 53 on which a pinion 54 is rotatably mounted. This pinion engages the external teeth 55a of a ring 55, which is also coaxial with the optical axis and which may be used to set the exposure time of the shutter by adjusting the shutter speed escapement mechanism, and the pinion also is meshed with the internal teeth 56a of another ring 56 which is also coaxial with the optical axis and cooperates with the ring 4 that positions the diaphragm lamellae 2. A brake, which may take the form of a leaf spring 57, engages the outer circumference of the ring 56 to increase the starting moment of rotation of that ring and make it less easy to turn initially than the ring 55. Thus when the setting ring 52 is rotated clockwise under pressure from the sensing member 47, the axle 53 of the pinion 54 is carried along in the same clockwise direction and, since the brake 57 makes the ring 56 initially resist movement, the pinion rotates on its axle and drives the ring 55 clockwise by means of the teeth 55a.

Of the two exposure factors, shutter speed and diaphragm aperture, the embodiment of FIG. 1 uses the ring 55 for affecting the shutter speed and the ring 56 for affecting the diaphragm setting. To accomplish this the ring 55 has a cam 55b which increases radially outwardly and which acts upon the aforementioned linkage, or load transmission mechanism, that sets the shutter speed escapement mechanism. This linkage consists in the present embodiment, of a lever 58 which is rigidly attached to a shaft 59 that extends parallel to the optical axis of the shutter and carries a pin 60 which acts as a cam follower bearing against the cam 55b. The shaft 59 may be pivotally mounted in a sleeve 61 affixed to the carrier plate 1 and may carry at the end remote from the lever 58 a lever 62 with a forked end that embraces the pin 32 of the lever 30. The lever 62 is rigidly attached to the shaft 59. A spring 63 on the shaft 59 exerts pressure between the fixed pin 8 and the pin 60 to urge the shaft 59 to rotate in the clockwise direction, thus tending to keep the linkage 58 to 60 and 62 and the shutter speed escapement mechanism connected thereto in the starting position associated with the longest exposure time, or slowest speed of the shutter. This may be, typically, 1/30 second. Sensing means including lever 64 is also rotatably mounted on the end of the shaft 59 beyond the lever 62 and is provided with a sensing pin 65 that serves as a cam follower for a cam 66a on the shutter speed setting control 66. In the embodiment shown, this control sets the manually preselectable exposure factor, which in this case is the shutter speed. The control 66 is set with respect to the fixed mark 45 by reference to a scale 66c of shutter speeds. The setting of the control 66 is transmitted to the shutter speed escapement mechanism by means of an arm 64a on the sensing lever 64. The arm 64a is engaged by a spring 67 which urges it into contact with the forked lever 62 so as to obtain a unilateral driving connection which is operative in the clockwise direction.

Like the ring 55, the ring 56 also carries a radially ascending cam 56b which influences the position of the diaphragm control ring 4. The transmission of control influence from the cam 56 to the ring 4 is effected by a linkage which includes a bellcrank lever 68 pivotally mounted on a pin 69 on the carrier plate 1. One arm 68a of the lever 68 has a pin 70 that serves as a cam follower riding upon the surface of the cam 56b while the other arm 68b presses against the pin 11 of the ring 4. Upon clockwise rotation of the ring 56, the diaphragm lamellae 2 are moved in toward positions of increasingly smaller diaphragm aperture. When the lamellae reach the position of smallest diaphragm aperture, an edge 56c of the ring 56 strikes a fixed pin 71 and stops any further clockwise rotation of the ring.

The arrangement of FIG. 1 includes not only means for automatically controlling one exposure factor after preselection of the other factor, which means have been set forth hereinabove, but also means for controlling the one exposure factor manually as may be necessary, for example, when taking photoflash pictures. For this purpose a diaphragm aperture setting ring, or control 72 is provided which may be set with the aid of a fixed mark 73 at various positions including a position marked "Auto" as well as positions indicated by a scale 74 comprising all of the diaphragm numbers of the diaphragm and lens being used. If the word "Auto" 'is placed opposite the mark 73, the diaphragm will be set automatically using the apparatus described hereinabove. However, if the control 72 is set so that one of the numerical indicia of the scale 74 is opposite the mark 73, the automatic exposure setting device will be rendered inoperative and the diaphragm lamellae 2 will be set manually. For this purpose the diaphragm control 72 has a slot 72a which is engaged by a pin 75. The latter is affixed to a bell crank lever 76 which is pivotally mounted on a pin 77 and which has a free arm that engages the pin 12 of the diaphragm control ring 4.

The diaphragm control 72 disconnects or renders inoperative the automatic mechanism by way of an arresting lever 78 which becomes operative when the diaphragm control is set to its manual range of positions. Since the shutter speed has been referred to, for the sake of clarity, as the preselectable exposure factor, the diaphragm setting may be considered the other exposure factor and thus the setting of the other exposure factor to a manually controlled location will disconnect the automatic controls. The arresting lever 78 engages a projection 52b of the setting ring 52 which is so arranged as to be capable of retaining the rings 55 and 56 in their respective starting positions as shown in the drawing. The lever 78 is pivotally mounted on a pin 79 and has a pin 80 that engages the outer circumference of the diaphragm control 72 under the force of a spring 81. In the position "Auto"' the pin 80 lies against the peripheral section 72b of the diaphragm control 72 which holds the arresting lever 78 in its non-blocking position as shown in FIG. 1. If the diaphragm control is placed in the "Manual" setting range the pin 80 engages the peripheral section 72f allowing the arresting lever 78 to pivot counterclockwise under the force of the spring 81, thus moving the lever 78 into the path of projection 52b.

In addition to interrupting mechanically the automatic operation of the mechanism when the diaphragm control 72 is moved into one of its manual range of positions, a switch is provided which includes contact springs 83 and 84 spaced apart by an insulator 82 and connected to the photocell 37 and to the coil 36 by way of wires 83a and 84a to short-circuit the photocell and thus to prevent current from flowing in the rotating coil 36. This renders the automatic mechanism electrically inoperative. The contact spring 84 is pressed against the spring 83 by a lever 85 pivotally mounted on a fixed pin 86. A spring 85a urges the lever to rotate in the clockwise direction but it is prevented from doing so, except in a controlled manner, by a pin 87 that engages a control slot 72c of the diaphragm control 72. This slot is so shaped that the connection between the contacts 83 and 84 is broken when the diaphragm control is placed in its "Auto" position but the connection is made when the diaphragm control is set to any position within its manual range of positions indicated by the scale 74.

The operation of the foregoing device will now be described as it permits automatic control of one exposure factor after preselection of the other exposure factor and overriding correction of the preselected factor. It should be noted that the operation starts with the shutter speed set to the longest exposure time and with the diaphragm set to the largest aperture and proceeds toward shorter exposure times, or faster shutter speeds, and smaller diaphragm apertures. Basically there are three different cases: Case A—Too Little Light, in which case the preselected exposure time cannot be attained; Case B—Sufficient Light, in which case the preselected exposure time is used and a proper corresponding diaphragm aperture is automatically set; and Case C—Too Much Light, in which case the preselected exposure time is too great so that a shorter exposure time is actually set by the escapement mechanism.

*Case A—Too little light.*—This condition results from a mistake by the photographer in setting the shutter speed control 66 to a speed value on the scale 66c that does not permit the shutter blades 13 to be open long enough to make a satisfactory exposure even if the diaphragm lamellae 2 remain in their most open position. When the shutter release 28 is depressed under such circumstances, the position of the exposure meter needle 46, as governed by the current produced in the photocell 37 and by the position of the arm 40 under control of the pin 42 and the cam 43a, will be such that the needle will be relatively far to the left in its range of positions and thus the sensing member 47 will be able to move downwardly only a very short distance before one of the steps on the stepped cam 47a strikes the exposure meter needle. As a result of this small movement of the sensing member 47, the setting ring 52 will likewise be moved through only a small angle.

Because the ring 56 is prevented from moving by the brake 57, the pinion 54 begins to roll on the internal teeth 56a, thereby driving the ring 55 clockwise. This causes the cam 55b to move the pin 60 and thereby to pivot the pin 59 and the forked lever 62, together with the sensing lever 64, in the counterclockwise direction. As a result, the sensing pin 65, which initially occupies a position close to the outer arcuate edge of the shutter speed control 66, moves toward the step on the cam 66α that happens to be opposite the pin 65, but does not reach this step before the rotary motion of the ring 55, and hence the movement of the pin 65, is terminated. This causes the forked lever 62 to stop in a position which does not correspond to the previously set exposure time, but instead to a longer exposure time. As a consequence, the escapement means which operates the shutter blades 13 and which are controlled directly by the position of lever 62 and only indirectly by the shutter speed control 66 will cause the shutter blades 13 to remain open for a longer time than is indicated on the scale 66c.

The diaphragm setting mechanism remains in its initial position, with the diaphragm lamellae at positions corresponding to the largest aperture. This happens because the rotary motion of the ring 55 stops before the pin 65 strikes the cam 66a. As is normally the case, the continued movement of the shutter release trigger 28 strikes the release lever 24 which, in turn, drives the arresting lever 22 and releases the disc 17 so that it is able to run down and to operate the shutter blades 13.

What has happened is that the mechanism has automatically caused the exposure to be made with the largest diaphragm opening and at a shutter speed longer than expected by the photographer, but suitable to make a satisfactory exposure of the film.

*Case B—Sufficient light.*—This case corresponds to a rather wide range of shutter speed settings which cause the shutter to be open for at least a time long enough to make an exposure when the diaphragm is set at its largest aperture value, but not so long as to over-expose the film when the diaphragm is moved by the automatic mechanism to its smallest aperture setting. As in all cases, the exposure begins with depression of the shutter release 28. The needle 46 may be at any of its positions and the sensing member 47 will move downwardly until one of the steps of the stepped cam 47a strikes the needle. In so doing, the ring 52 will be turned, thus causing the pinion 54 to be rotated by the internal teeth 56a and to rotate the ring 55. This, in turn, rotates the pin 59 until the sensing pin 65 strikes the particular step of cam 66a that happens to have been placed opposite the pin 65 by the setting of the shutter speed scale 66c with reference to the mark 45. At the same time, the levers 62 and 64 both move counterclockwise.

If the sensing member continues to move downwardly after the pin 65 makes contact with one of the steps of the cam 66a, the setting ring 52 and the pinion 54 continue to rotate. However, this rotary motion can no longer cause the shaft 59 to rotate. Instead, the spring 67 now comes into operation to interconnect the two levers 62 and 64, while allowing relative rotary motion between them in one direction. The strength of the spring is chosen so that a greater force is required to overcome the pressure of the spring 67 by rotating the ring 55 than is required for overcoming the drag of the brake 57 on the ring 56. As a result, the pinion 54 no longer continues to be rotated by the internal gear teeth 56α but instead is rotated by the external gear teeth 55a, thereby driving the gear teeth 56a and thus turning the ring 56 clockwise. The preselected shutter speed thus remains set, while the additional motion of the sensing member 47 causes the automatic movement of the diaphragm lamellae 2 by way of the cam 56b acting on the cam follower pin 70 and pivoting the lever 68 so as to rotate the setting ring 4 to the proper position to set the diaphragm aperture size exposure factor to correspond with the preselected shutter speed and the available light.

*Case C—Too much light.*—This condition arises when the photographer sets the shutter speed at such a low value that an over-exposure of the film would be made even if the diaphragm were automatically set to its smallest aperture value.

Upon depression of the trigger 28 and movement of the sensing member 47 and corresponding movement of the ring 52, the pinion 54, the ring 55, and the pin 65 to the point at which further movement of the pin 65 is halted by coming in contact with one of the steps of the cam 66a, and upon further movement of the sensing member 47 beyond the position in which the ring 55 has moved the diaphragm setting ring 4 to a position in which the lamellae 2 are closed to their smallest aperture value, the edge 56c of the ring 56 will finally strike the fixed pin 71 and will thereby prevent any further rotation of the ring 56. This again reverses the operation of the pinion 54, which, being unable any further to rotate the ring 56, must itself be rotated by the internal teeth 56a, thereby renewing the rotation of the ring 55. This causes the forked lever 62 to rotate in spite of the force of the spring 67, thus lifting the forked lever 62 away from the sensing lever 64 and moving the forked lever so as to pivot the lever 30 and to set the escapement mechanism to a value which will result in a shorter exposure than that for which the shutter speed control 66 was originally pre-set.

In each of the above-described cases, the diaphragm control, or setting member, 72 is, as already indicated, in the "Auto" setting position. If the diaphragm control 72 is so rotated that one of the diaphragm values marked on the scale 74 is opposite the mark 73, the automatic setting device will be blocked by means of the arresting lever 78 acting on the setting ring 52. At the same time, the switch comprising contacts 83 and 84 will be closed by the lever 85, thus short-circuiting the photocell 37 and causing the exposure meter needle 46 to return to its starting position. Both the setting ring 52 and the two rings 55 and 56 will also return to and remain in their starting positions, corresponding to a setting of the longest exposure time and of the largest diaphragm aperture. In the embodiment of FIG. 1, this corresponds to an exposure time of 1/30 sec. and a diaphragm value of 2.8. In this setting position, the sensing pin 65 of the sensing lever 64 is free, so that there is no change in the exposure time setting when the shutter speed control 66 is rotated. This manner of setting the exposure factors of the camera, which, at a constant exposure time of 1/30 sec., allows the manual setting of the diaphragm according to the scale 74 in the range from a diaphragm value of 2.8 to a diaphragm value of 22, is predominantly used for flash photography.

As is apparent from FIG. 1, the camera is equipped with an indicating device which, in addition to indicating the preselected exposure time values, informs the photographer about the values of exposure time and diaphragm which have actually been set during the automatic exposure setting and which also permits conclusions to be drawn as to whether useful photographs may be expected to be taken under the prevailing light conditions. This indicating device comprises, in addition to the exposure meter needle 46, three main components. These are: A fixed scale carrier 88 extending over the entire range of motion of the exposure meter needle 46, a setting member of the preselectable exposure factor, which in the embodiment of FIG. 1, is the shutter speed control 66, and an indicating flag 89, the setting position of which can be influenced. Associated with these structural members is a mask 90 which can be controlled by means of the film sensitivity control 43. The fixed scale carrier 88 comprises three scale rows. The upper scale row is associated with the preselectable exposure factor, which, in the present embodiment, is the exposure time. The upper row therefore shows numerical values which correspond to the scale 66c of the shutter speed control 66. The middle and the lower scale rows are subdivided into a left and a right scale group. The lower scale row of the left scale group is composed of numerical values which happen, in the present embodiment, to be equivalent to exposure times from 1/30 sec. to 1/250 sec., while the lower scale row of the right scale group shows the numerical values which are identical with exposure times from 1/60 sec. to 1/500 sec. Together with the lower scale row on the left, there also appears several times the extremely high diaphragm value 2.8, while the extremely low diaphragm value 22 appears several times with the lower scale row on the right.

A catch 89c on the indicating flag or lug may serve for attaching a string or thread 91, the other end of which is secured to a pin 92 carried by a lever 94 pivotally mounted on a fixed pin 93. The bell crank lever 94, in turn, has a pin 95 that extends into a control slot 66b on the shutter speed control 66. A spring 96 is attached to the catch 89c to pull the indicating flag 89 into its right end position. The indicating flag 89 also has a window 89d through which the upper scale row of the fixed scale carrier 88 may be viewed. The exposure time value preselected by means of the shutter speed control 66 appears in this window. Moreover, the indicating flag 89 also carries a diaphragm scale which increases from the left to the right and which carries the diaphragm values from 2.8 to 22.

The mask 90 operatively connected to the film sensitivity control 43 is rigidly attached to the shaft end 38 for positioning the frame 35, and, thereby, the rotating coil 36. Both the mask 90 and the fixed scale carrier 88 carry at their left end a symbol which is intended to indicate that it is necessary to take photographs with artificial light, such as a flashgun, for obtaining useful photographs, if the exposure meter needle 46 is located in this left marginal region.

In the setting position shown in the drawing, the indicating flag 89 covers the upper scale of the preselectable exposure factor, except for the figure "125," which is visible in the window 89d. This means that the exposure time 1/125 sec. has been preselected on the shutter by means of the shutter speed control 66. As long as the exposure meter needle 46 stays within the range occupied by the indicating flag 89, it may be expected that both the preselected exposure time and the diaphragm value indicated on the indicating flag by the exposure meter needle 46 will actually be set. However, if the exposure meter needle 46 points to one of the time/diaphragm pairs which are contained in the two scale groups of the fixed scale carrier 88, it means that the exposure time corresponding to the preselection and visible in the window 89d, is not being used but that a different exposure time is set according to the time/diaphragm pair indicated by the exposure meter. Moreover, the arrangement of the indicating device may also be such that the values indicated become visible in the view finder 108 of the camera.

In order to ensure that no exposure with automatic setting of the exposure factors time and diaphragm can be effected if the light conditions are outside of the operating range of the camera, an additional locking device is provided. In this connection, it should be recalled that the release bar 28 impinges, after the setting process is terminated, on the release lever 24, which, by way of the arresting lever 22, releases the shutter for running down. However, according to FIG. 1, if the light conditions make it possible to make a satisfactory photographic exposure, the release lever 24 will be unable to move, since its arm 24b will rest on an arresting lever 97. The arresting lever 97 is positioned on a fixed pin 98 and is capable of fully absorbing the pressure of the shutter release 28. A coil spring 99 which bears at one end against a fixed pin 100 and, at the other end, against the arresting lever 97, tends to retain the arresting lever in the arresting position shown in the drawing. But the arresting lever carries a pin 101, which cooperates with a cam 52c of the setting ring 52, and as soon as the setting ring 52 moves clockwise by a small amount during the sensing process, the pin 101 is pushed away to the right by the cam 52c, and the arresting lever 97 is pivoted out of the range of the release lever 24. The longitudinal extension on the cam 52c moving the arresting lever 97 is such that, if there is too much light, exceeding the setting range of the camera, the pin 101 of the arresting lever, having reached a setting position of the setting ring 52 corresponding to the time/diaphragm pair 1/500 sec. and diaphragm 22, slides off the cam 52c, thereby enabling the arresting lever 97 to return again to its operative position to prevent the shutter release 28 from actuating the shutter drive mechanism.

In order to obtain the same effect if the light conditions are too weak and hence unsuitable for taking a photograph with automatic exposure setting, a device or mechanism is provided, which, during the sensing process, brings the setting ring 52 to a stop, before its cam 52c is able to become operative on the pin 101 of the arresting lever 97. This device or mechanism comprises an arresting slide 102 which is guided on the frame 35 of the exposure meter, so as to be displaceable parallel to the sensing member 47. The arresting slide 102 has a slot 102a, which is engaged by two guide pins 103 and 104 fixed to the frame 35. A spring 105 which abuts at one end against the arresting slide 102 and, at the other end, against a fixed pin 106, tends to keep the slide in the inoperative position (shown in the drawing), in which it engages a pin 107 of the sensing member 47 due to the action of the spring 105. If the light is too weak or if the photocell 37 is short-circuited, the exposure meter needle 46 is located under an edge 102b of the arresting slide 102. In this case, when the release bar 28 is depressed, the arresting slide 102, having traveled a short path, is retained by the exposure meter needle 46 which, in turn, bears against the supporting arch 35a. Owing to the pin 107 which rests on the arresting slide 102, the sensing member 47 also comes to a standstill. The short distance traveled by the sensing member 47 during this time is not sufficient to rotate the setting ring 52 to such an extent that its cam 52c causes the release locking device formed by the lever 97 to become inoperative. Only when the light intensity has risen to such an extent that the exposure meter needle 46 releases the edge 102b of the arresting slide, will it be possible to effect an exposure with automatic exposure setting.

As described above, the camera, according to the invention, permits photographs to be taken not only with automatic exposure setting, but also with manual exposure setting by placing the diaphragm control, or setting member 72 at a position within the manual setting range defined by the scale 74. However, since the setting ring 52 is locked in a starting position by the pawl 78 when the control 72 is in its manual range, the cam 52c of the ring 52 will not be able to disconnect the releasable locking device formed by the lever 97. For this reason, the control 72 has a hole, or opening, 72d, into which projects the pin 101 secured to the arresting lever 97. If the diaphragm control 72 is moved out of the "Auto" setting position and is set at the range of the diaphragm scale 74, the pin 101 will be pushed out of the opening 72d by the obliquely ascending edge 72e, and this will pivot the arresting lever 97 into its inoperative position.

In the above-described embodiment, the development and arrangement of the device for the pre-selection of one exposure factor and for the automatic setting of the other exposure factor with simultaneous correction of the pre-selected exposure factor are such that it is possible to pre-select the exposure time factor with the aid of the setting member 66, while the automatic setting of the diaphragm lamellae 2 is effected by means of the ring 56 and the correction of the pre-selected exposure time, if required by the prevailing light conditions, is effected by means of the ring 55. However, the above-described embodiment does not oblige the photographer to make such a selection, since the arrangement might also be effected in such a way that the pre-selection of the diaphragm aperture size would be carried out first, which would then be followed by the automatic setting of the exposure time in response to the pre-selected diaphragm aperture and the prevailing light conditions. In this case, the ring 56 connected to the setting device for the exposure time and the ring 55 connected to the setting device for the diaphragm lamellae 2 would have to be operatively connected. This could be done in a manner analogous to the one explained with respect to the above-described and illustrated linkages, or load transmission mechanisms, 58 to 60, 62 and 68 to 70. In addition, the shutter speed control 66 would have to include the diaphragm cam, and the linkage 58 to 60, 62 would have to cooperate both with this cam and with the ring 4. The linkage 68 to 70, which is driven by the ring 56, would have to act on the exposure time escapement mechanism 30 to 34. In addition, the setting scales of the controls 66 and 72 and the scales on the indicating device 88 to 90 would have to be exchanged.

Instead of providing for the above-described rings 55 and 56 shown in FIG. 1, with their toothed sections 55a and 56a operatively connected to each other by means of the pinion 54, the device for the automatic introduction of the one exposure factor, for example, the diaphragm aperture value, as well as the other, pre-selected exposure factor, the exposure time may, according to the invention, be also arranged as in FIG. 2 so that the diaphragm lamellae 2' are pivotally positioned on a rotatable ring 55' arranged coaxially with the axis of the shutter. For this purpose, the ring 55' is provided with bearing pins 3'. The diaphragm lamellae 2' are actuated in the same manner as in the embodiment according to FIG. 1, namely, by means of a rotatably movable ring 4', whose pins 5' engage into slots 2a' of the diaphragm lamellae 2'. A spring 6', one end of which is attached to a pin 55c of the ring 55' and the other end of which is attached to a pin 4b of the diaphragm-lamellae ring 4', tends to rotate the ring 4' in the clockwise direction. A stop 4a' is provided for the purpose of fixing the starting position of the ring 4' associated with the largest aperture width of the diaphragm lamellae or the diaphragm value 2.8 by engaging a projection 55d of the ring 55'. The ring 55' is provided with a radially ascending cam 55b', which is acted on by the linkage designed to transmit the control influence of the ring 55' to the plate 30' and to the braking lever 33' of the exposure time, or shutter speed, escapement mechanism. This linkage 58' to 60' and 62' is identical with the linkage 58 to 60 and 62 of FIG. 1, while the setting ring, or control, 66' used for the pre-selection of the exposure time and the cam 66a' correspond to like-numbered, unprimed elements of FIG. 1.

Furthermore, pin 69' extends from the ring 55' parallel to the axis of the shutter and rotatably supports a bell-crank lever 68'. One arm 68a' of said bell-crank lever 68' carries a pin 70', which cooperates with a radially ascending cam 56b' on the ring 56'. The other arm 68b' of the bell-crank lever 68' bears against a pin 11' on the ring 4' that operates the lamellae 2'. One end of a spring 69a bears on the pin 69' to retain the ring 55', which, in this embodiment, takes the pre-selectable exposure factor into consideration, in the starting position, as shown in the drawing, in which it engages a fixed pin 9 by means of a projection 55f developed on said ring 55'.

The ring 56' has a radial cam 56b' and is operatively connected to the sensing member 47' of the exposure meter. This connection is effected by a pin 51' that extends from the sensing member and engages a slot 56c' of the ring 56'.

The end of the cam 56b' associated with the largest aperture width of the diaphragm lamellae 2' is so shaped that, upon the clockwise rotation of the ring 56' caused by the sensing member 47', this end first acts on the pin 70' of the bell-crank lever 68' in the manner of a driver. This causes the ring 55' and the diaphragm lamallae ring 4' that engages ring 55' due to the action of the spring 6' to be first moved synchronously in clockwise direction against the action of the spring 69a. During this process, the diaphragm lamellae 2' maintain, without change, their starting position associated with the largest aperture width, while the cam 55b' of the ring 55' causes the linkage 58' to 60' and 62' to carry out a counterclockwise rotary motion. If, during this rotary motion, the pin 65' of the sensing lever 64' finally impinges on the cam 66a' of the shutter speed control 66', the exposure time setting pre-selected by means of the ring 66' will have been reached.

If the ring 56' be rotated clockwise, still further, a relative rotary motion will be imparted to the forked lever 62' with respect to the sensing lever 64', whereby the spring 67' will be stressed. This, in turn, will increase the pressure of the linkage 58' to 60' and 62' on the cam 55b', causing the rotary motion of the ring 55' to be terminated temporarily while the subsequent relative motion of the cam 56b' with respect to the linkage 68' to 70' will cause the pin 70', which follows the cam 56b' during this process, to pivot the lever 68' clockwise about the pin 69'. Consequently, a relative rotary motion will be imparted to the diaphragm-lamellae ring 4' which will press its pin 11' against the lever arm 68b' and will pivot the diaphragm lamellae 2' toward positions of smaller aperture. If the diaphragm lamellae 2' reach, during this motion, their end position associated with the smallest aperture size for which they are designed, without having the motion of the ring 56' terminated by impingement of the sensing member 47' on the exposure meter needle, the catch 4a' of the diaphragm lamellae ring 4' will engage the projection 55e of the ring 55', while at the same time a driving lug 56e on the ring 56' will strike the pin 70' of the bell-crank lever 68'. As a result, if there is further rotary motion of the ring 56', the rings 55' and 4' will again be moved simultaneously in clockwise direction, so that, with the smallest diaphragm aperture remaining constant, a correction in the direction toward shorter exposure time values than the pre-selected exposure time will now be imparted to the shutter operating device, or mechanism.

In the two foregoing embodiments of the invention as shown in FIGS. 1 and 2, the linkage cooperating with the setting member as well as with the setting device or mechanism for the pre-selectable exposure factor, for example, the exposure time, is so arranged that the forked lever 62 or 62' acting on the input member of the setting device for the exposure time, i.e., on the plate 30 or 30' of the exposure time escapement mechanism, and the sensing lever 64 or 64' cooperating with the cam 66a or 66a' of the setting ring 66 or 66', tensionally engage each other due to the action of the spring 67 or 67'. In this case, the coil spring 63 or 63' serves the purpose of keeping the linkage in its starting position, which is associated with the longest exposure time of the shutter, for example, with the time 1/30 sec., and in which the pin 65 or 65' of the sensing lever 64 or 64' is lifted off the cam 66a or 66a' of the exposure time setting ring.

According to FIG. 3, the development of the linkage may also be such that the sensing lever 64" that cooperates with the cam 66a" of the exposure time setting ring 66" occupies, in the starting position of the above-described device, a setting position that corresponds to the pre-selected exposure time, whereby the sensing lever 64" comes to rest on the cam 66a". The starting position of the forked lever 62" acting on the input members 30" and 33" of the exposure time escapement mechanism corresponds, in this case, to the longest exposure time of the shutter, for example, to the time 1/30 sec. While the forked lever 62" arranged non-rotatably on the shaft 59" is for this purpose under the influence of a spring (not shown in the drawing), the sensing lever 64" is associated with a spring 64b, one end of which bears on said sensing pin 65" and the other end of which bears against a fixed pin 64c. The spring 64b thus exerts a constant moment of rotation on the sensing lever 64", whose sensing pin 65" is additionally supported by the cam 66a" of the exposure time setting ring 66". The sensing pin 65" is, preferably, of a length such that when the forked lever 62" reaches a setting position corresponding to the pre-selected exposure time, it engages the sensing pin 65". Upon further continuation of the setting motion, the two levers 62" and 64" must be moved jointly against the resistance of the spring 64b in the direction toward shorter exposure time values. Here again, we have the increase of the frictional resistances on the ring 55' and, as a necessary consequence thereof, a change of the conditions of motion within the ring system 55', 56' when the pre-selected exposure time is reached.

The sensing lever 64" is pivotally mounted on a special, fixed pin, or pivot, 64d, as shown in FIG. 3. However, the sensing lever 64" may also be loosely positioned on the shaft 59", for example, in the manner of the sensing levers 64 and 64' according to the embodiment illustrated in FIGS. 1 and 2.

What is claimed is:

1. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; and means connected to and controlled by said meter and connected to the other of said devices to set said other of said devices in accordance with the other of said exposure factors, said means comprising first and second rings having, respectively, first and second cams, first and second load transmission mechanisms connecting each of said cams, respectively, to said devices, and a third cam on said setting member, the one of said load transmission mechanisms connected to said one of said devices comprising sensing means to engage said third cam.

2. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; and means connected to and controlled by said meter and connected to the other of said devices to set said other of said devices in accordance with the other of said exposure factors, said means comprising first and second rings having, respectively, first and second cams, first and second load transmission mechanisms connecting each of said cams, respectively, to said devices, and a third cam on said setting member, the one of said load transmission mechanisms connected to said one of said devices comprising a uni-directionally, rotatably drivingly arranged sensing lever and sensing pin to engage said third cam.

3. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; and means connected to and controlled by said meter and connected to the other of said devices to set said other of said devices in accordance with the other of said exposure factors, said means comprising first and second rings having, respectively, first and second cams, first and second load transmission mechanisms connecting each of said cams, respectively, to said devices, a third ring; a pinion gear mounted on said third ring to be moved thereby, teeth on each of said first and second rings meshed with said pinion gear, said third ring and said pinion gear forming the connection between said meter and said first and second rings, and a third cam on said setting member, the one of said load transmission mechanisms connected to said one of said devices comprising a sensing lever and sensing pin connected to said third cam and connected to said one of said devices for uni-directional driving engagement therewith.

4. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; and means to set said other of said devices in accordance with the other of said exposure factors, said means comprising a first ring having external teeth and a second ring having internal teeth, first and second cams on said first and second rings, respectively, first and second load transmission mechanisms connecting each of said cams, respectively, to said devices, a third ring connected to said exposure meter to be rotated in response thereto, a pinion gear mounted on said third ring to be moved thereby, said pinion being meshed with said teeth on each of said first and second rings, and a third cam on said setting member, the one of said load transmission mechanisms connected to said one of said devices comprising a sensing lever and sensing pin connected to said third cam and connected to said one of said devices for uni-directional driving engagement therewith.

5. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; and means to set the other of said devices in accordance with the other of said exposure factors, said means comprising a first ring having gear teeth and a second ring having gear teeth, first and second cams on said first and second rings, respectively, a first load transmission mechanism connecting said first cam to said one of said devices, a second load transmission mechanism connecting said second cam to said other of said devices, a third ring connected to said exposure meter to be rotated in response thereto, a pinion gear mounted on said third ring to be moved thereby, said pinion being meshed with said teeth on each of said first and second rings, an escapement device connected to said second ring to cause said first ring to rotate first, and a third cam on said setting member, the one of said load transmission mechanisms connected to said one of said devices comprising a sensing lever and sensing pin following said third cam and connected to said one of said devices for uni-directional driving engagement therewith.

6. The photographic camera according to claim 5, in which said escapement mechanism comprises a spring brake bearing against a portion of said second ring.

7. A photographic camera comprising an exposure meter; a shutter; first means to set the operating speed of said shutter in accordance with one exposure factor; a diaphragm having an aperture; second means to set the diaphragm in accordance with a second exposure factor; and a setting member connected to one of said means to pre-select one of said exposure factors, the other of said means comprising a first ring supporting said diaphragm and having a cam, a first linkage connected to said cam and to said setting member and to said first means, a sensing member connected to and controlled by said exposure meter, a second ring connected to said sensing member to be moved thereby, a third ring having means engaging said first ring to cooperate therewith, and a second linkage connecting said first, said second and said third rings whereby said second means is controlled automatically by said meter in cooperation with the setting of said one of said means and in accordance with the other of said exposure factors.

8. The photographic camera according to claim 7, in which said means engaging said first ring comprises a spring to resiliently connect said third ring to said first ring.

9. A photographic camera comprising an exposure meter; a shutter; a first setting device to set the operating speed of said shutter in accordance with one exposure factor; a diaphragm having an aperture; a second setting device to set the diaphragm in accordance with a second exposure factor; a setting member connected to said first device to pre-select said one exposure factor; and means connected to and controlled by said meter and connected to said second device to set said second device in accordance with said second exposure factor, said means comprising a first ring supporting said diaphragm and having a cam, a linkage connected to said cam and to said setting member and to said first device; a sensing member controlled by said exposure meter; a second ring connected to said sensing member to be moved thereby, a third ring having means for engaging said diaphragm to cooperate with said first ring in setting the aperture of said diaphragm, a spring connecting said third ring to said first ring, and a bell-crank lever connecting said first, said second and said third rings whereby said second device is controlled automatically by said meter and in cooperation with the setting of said first device.

10. A photographic camera comprising an exposure meter; a shutter; a first setting device to set the operating speed of said shutter in accordance with one exposure factor; a diaphragm having an aperture; a second setting device to set the diaphragm in accordance with a second exposure factor; a setting member connected to said first device to pre-select said one exposure factor; and means connected to and controlled by said meter and connected to said second device to set said second device in accordance with said second exposure factor, said means comprising a first ring supporting said diaphragm, a first cam on said ring, a linkage connected to said cam and to said setting member and to said first device, a sensing member connected to and controlled by said exposure meter, a second ring connected to said sensing member to be moved thereby, a second cam on said second ring, a third ring having means for engaging said diaphragm to cooperate with said first ring in setting the aperture of said diaphragm, a first spring connecting said third ring to said first ring, a second linkage comprising means engaging said second cam to be governed thereby, and additional means connected to said third ring to exert force thereon to rotate the same in response to movement of said second cam, said second linkage being connected to said first ring, a second spring resiliently biasing said second linkage whereby rotation of said second ring first rotates said first and third rings simultaneously against the force of said second spring, and a third spring engaging said first-named linkage to provide a resilient resistance thereon when said first setting device is set to its pre-selected position whereby continued movement of said second ring imparts relative rotary motion between said first ring and said third ring to set the diaphragm aperture in accordance with said second exposure factor.

11. A photographic camera according to claim 10, in which said first setting device comprises an input member and comprising, in addition, a forked lever engaging said input member to control the operation of said first setting device, and a sensing lever tensionally connected to said forked lever and engaging said setting member to be controlled thereby.

12. A photographic camera according to claim 11, in which said sensing lever is freely movable, said camera comprising, in addition, a fourth spring resiliently biasing said sensing lever into engagement with said setting member.

No references cited.

NORTON ANSHER, *Primary Examiner.*